(12) United States Patent
Ortega

(10) Patent No.: US 7,754,993 B2
(45) Date of Patent: Jul. 13, 2010

(54) METHOD FOR PROVIDING A DRY ENVIRONMENT FOR UNDERWATER REPAIR OF THE REACTOR BOTTOM HEAD USING A SEGMENTED CAISSON

(75) Inventor: Frank Ortega, San Jose, CA (US)

(73) Assignee: General Electric Company, Schenectady, NY (US)

(*) Notice: Subject to any disclaimer, the term of this patent is extended or adjusted under 35 U.S.C. 154(b) by 1037 days.

(21) Appl. No.: 11/482,798

(22) Filed: Jul. 10, 2006

(65) Prior Publication Data

US 2009/0323882 A1   Dec. 31, 2009

(51) Int. Cl.
B23K 9/16 (2006.01)
G21C 19/00 (2006.01)

(52) U.S. Cl. .............................. 219/72; 219/61; 219/74; 376/260

(58) Field of Classification Search ............... 219/60 A, 219/61, 74, 75, 72; 376/260; 29/402.07, 29/402.09
See application file for complete search history.

(56) References Cited

U.S. PATENT DOCUMENTS

| | | | | |
|---|---|---|---|---|
| 2,553,899 | A | * | 5/1951 | Dempsey ..................... 228/57 |
| 3,837,171 | A | * | 9/1974 | Scurlock ..................... 405/193 |
| 5,037,604 | A | * | 8/1991 | Bauer et al. .................. 376/260 |
| 5,059,384 | A | * | 10/1991 | Dixon et al. ................. 376/260 |
| 5,135,154 | A | * | 8/1992 | Yoshida et al. ................. 228/46 |
| 5,254,835 | A | * | 10/1993 | Dalke et al. ............ 219/125.11 |
| 5,852,271 | A | | 12/1998 | Offer |
| 5,876,146 | A | | 3/1999 | Deaver et al. |
| 6,060,686 | A | | 5/2000 | Jones |
| 6,265,689 | B1 | | 7/2001 | Fusaro, Jr. |
| 6,417,476 | B1 | | 7/2002 | Offer et al. |
| 7,076,017 | B2 | | 7/2006 | Offer |
| 2002/0195429 | A1 | * | 12/2002 | Fusaro et al. .................. 219/74 |
| 2005/0269383 | A1 | * | 12/2005 | Ortega et al. ................. 228/101 |

FOREIGN PATENT DOCUMENTS

WO        WO 9533267 A1 * 12/1995

* cited by examiner

*Primary Examiner*—Stephen J Ralis
(74) *Attorney, Agent, or Firm*—Nixon & Vanderhye, P.C.

(57) ABSTRACT

Welding repairs are performed in an underwater environment adjacent the bottom head of the nuclear reactor vessel. To provide a dry welding environment, segments of a lower caisson are passed through the core plate holes and assembled along the interior surface of the bottom head. The assembled segments are held down by brackets and sealed to one another and to the bottom head by a water curable polymer. An upper caisson is passed through the core plate hole to sealingly engage the lower caisson. The caissons are pumped dry and welding equipment is passed through the caissons to effect weld repairs about the stub tube or along the bottom head cladding.

10 Claims, 6 Drawing Sheets

US 7,754,993 B2

METHOD FOR PROVIDING A DRY ENVIRONMENT FOR UNDERWATER REPAIR OF THE REACTOR BOTTOM HEAD USING A SEGMENTED CAISSON

BACKGROUND OF THE INVENTION

The present invention relates to methods for providing a dry environment for underwater repair of reactor bottom heads in a restrictive access environment.

There is an emerging need for effecting weld repairs at the bottom head of boiling water reactors. For example stub tubes, incore housing penetrations, pressure lines penetrations and cladding surface repair along the bottom head of the nuclear reactor vessel often require weld repairs. Generally, such weld head repairs have been effected subsequent to draining the nuclear reactor vessel in order to provide a dry environment for welding. Accordingly, there is a need for a method of effecting weld repairs and inspections at the bottom head of nuclear reactor vessels in a totally dry environment and without draining the reactor vessel.

SUMMARY OF PREFERRED EMBODIMENTS OF THE INVENTION

In a preferred embodiment of the present invention there is provided, in a nuclear reactor vessel having a core plate and a generally hemispherically shaped bottom head with a plurality of penetrations enabling control rod drives to pass through the penetrations to support control rods, a method of repairing or mitigating crack formation at the bottom head of the vessel comprising the steps of: passing segments of a first caisson through holes in the core plate to a location about a tube secured to the bottom head and surrounding a penetration; assembling the segments about the tube; sealing the segments to one another and to the bottom head; passing a second caisson through a core plate hole and into engagement with the first caisson; removing water from the first and second caissons to provide a water-free environment for welding; and lowering a welding head through the second caisson and into the first caisson to apply a weld about the tube or along the bottom head.

In another preferred embodiment of the present invention, there is provided in a nuclear reactor vessel having a core plate and a generally hemispherically shaped bottom head, a method of repairing or mitigating crack formation at the bottom head of the vessel comprising the steps of: passing segments of a first caisson through holes in a core plate to a location adjacent the bottom head; assembling the segments to form an enclosure; sealing the segments to one another and to the bottom head; passing a second caisson through a core plate hole and sealing a lower end thereof to the first caisson; removing water from the first and second caissons to provide a water-free environment for welding; and lowering a welding head through the second caisson and into the first caisson to apply a weld.

DETAILED DESCRIPTION OF THE INVENTION

Figure 1:
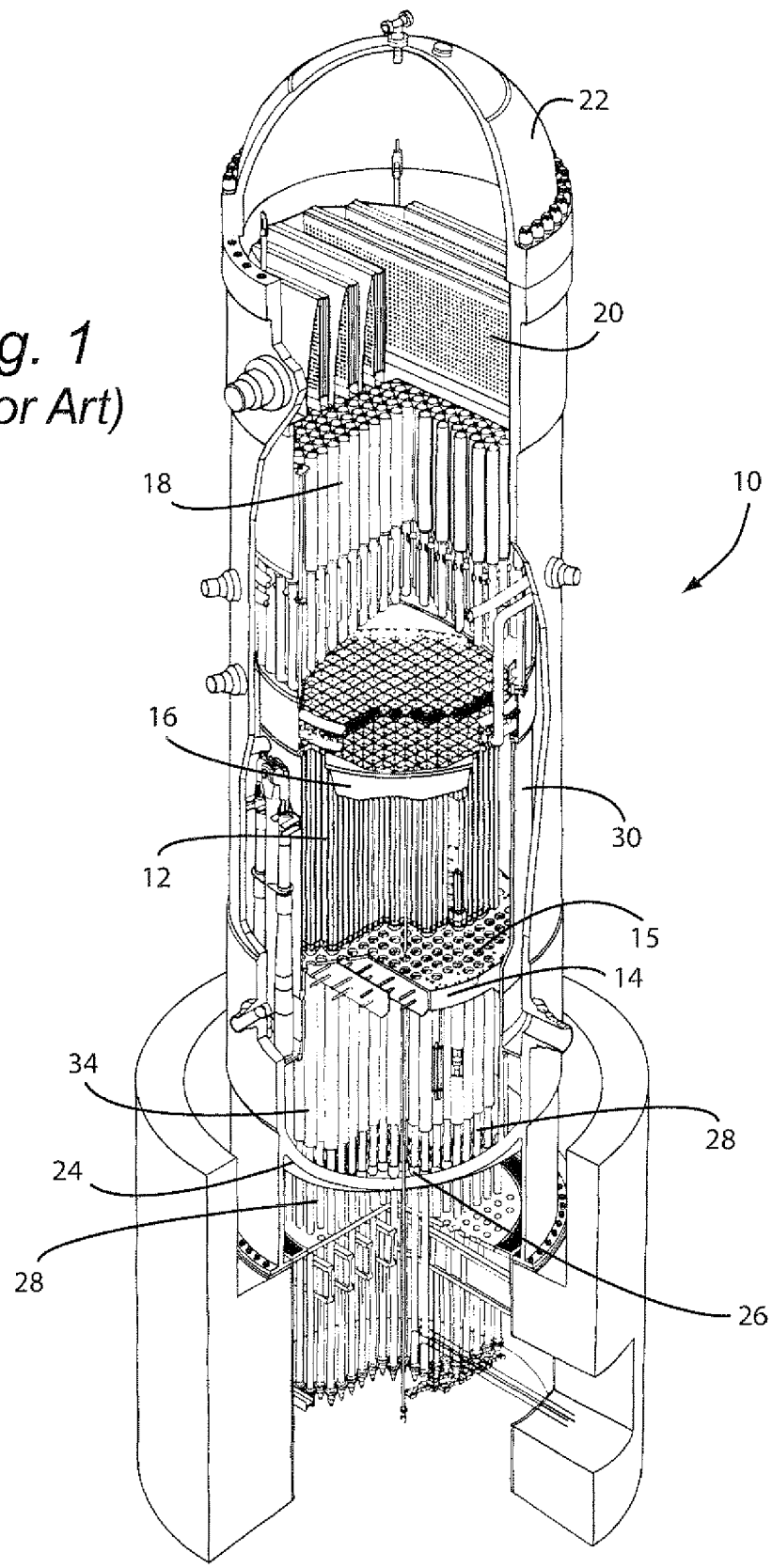
FIG. 1 is a perspective illustration with parts broken out in a cross section of a boiling water nuclear reactor vessel.

Referring now to FIG. 1 there is illustrated a nuclear reactor vessel generally designated 10 and including a plurality of fuel assemblies 12 carried on a core plate 14, a top guide 16, a steam separator assembly 18, steam dryer assembly 20 and a top head 22. The core plate has a plurality of openings 15. Below the core plate 14, there is provided a generally hemispherically shaped bottom head 24 through which various penetrations are made including stub tubes 26 and control rod housings 34 through which control rod drives 28 are received as well as other incore housings. It will be appreciated that the bottom head contains the water within the vessel 10. Also illustrated is the core shroud 30 which surrounds the core and provides a barrier to separate the upper flow through the core from the downward flow between the annular core shroud 30 and the outer wall of the vessel. It will also be appreciated that each of the fuel assemblies that makes up the core rests on an orificed mounted on top of the control rod guide tubes. The top guide 16 engages the top of each fuel assembly and provides lateral support for the fuel assemblies.

Figure 2:
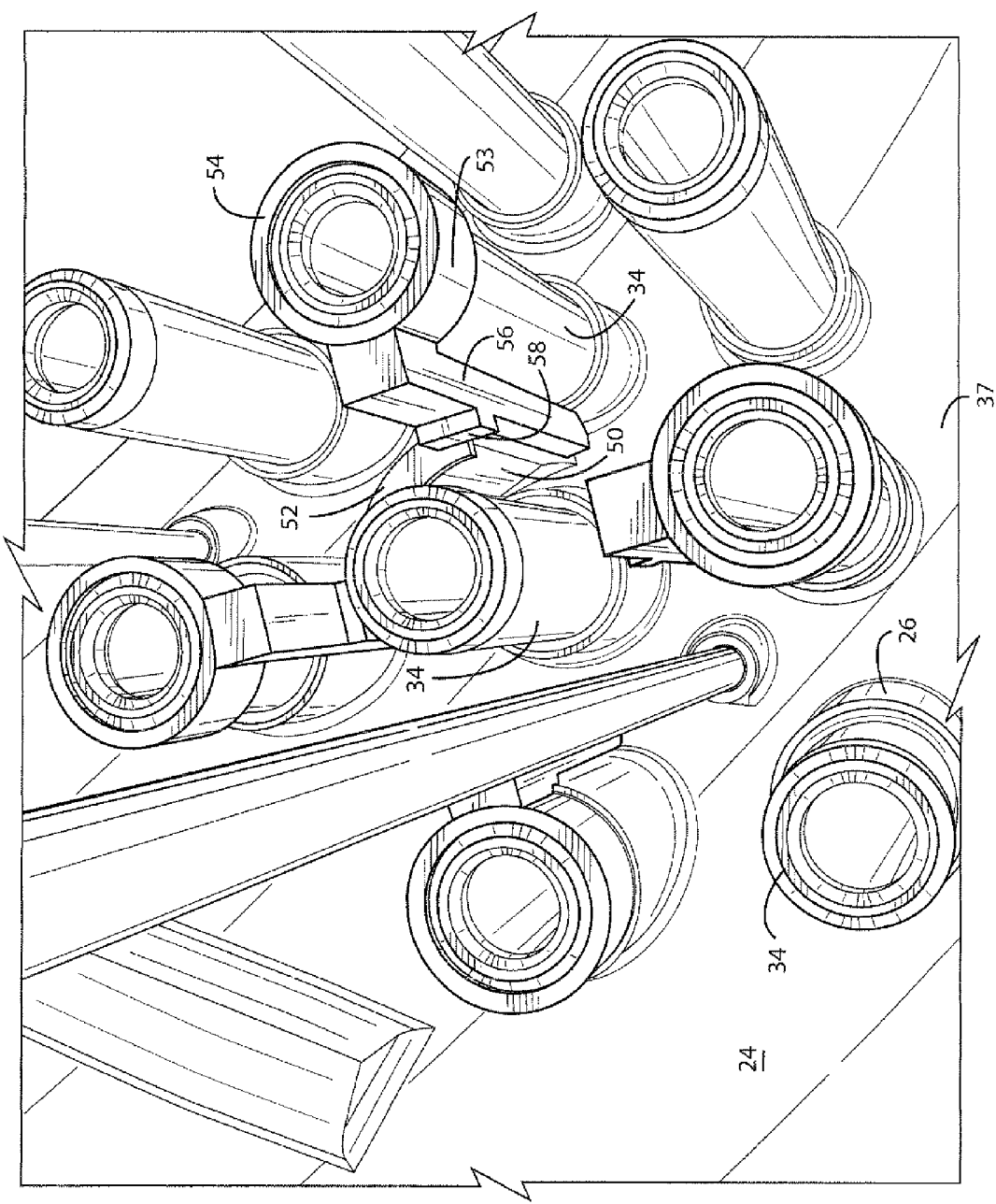
FIGS. 2-4 are fragmentary perspective views looking down on the inside surface of the generally hemispherical shaped bottom head of the nuclear reactor vessel.
Figure 3:
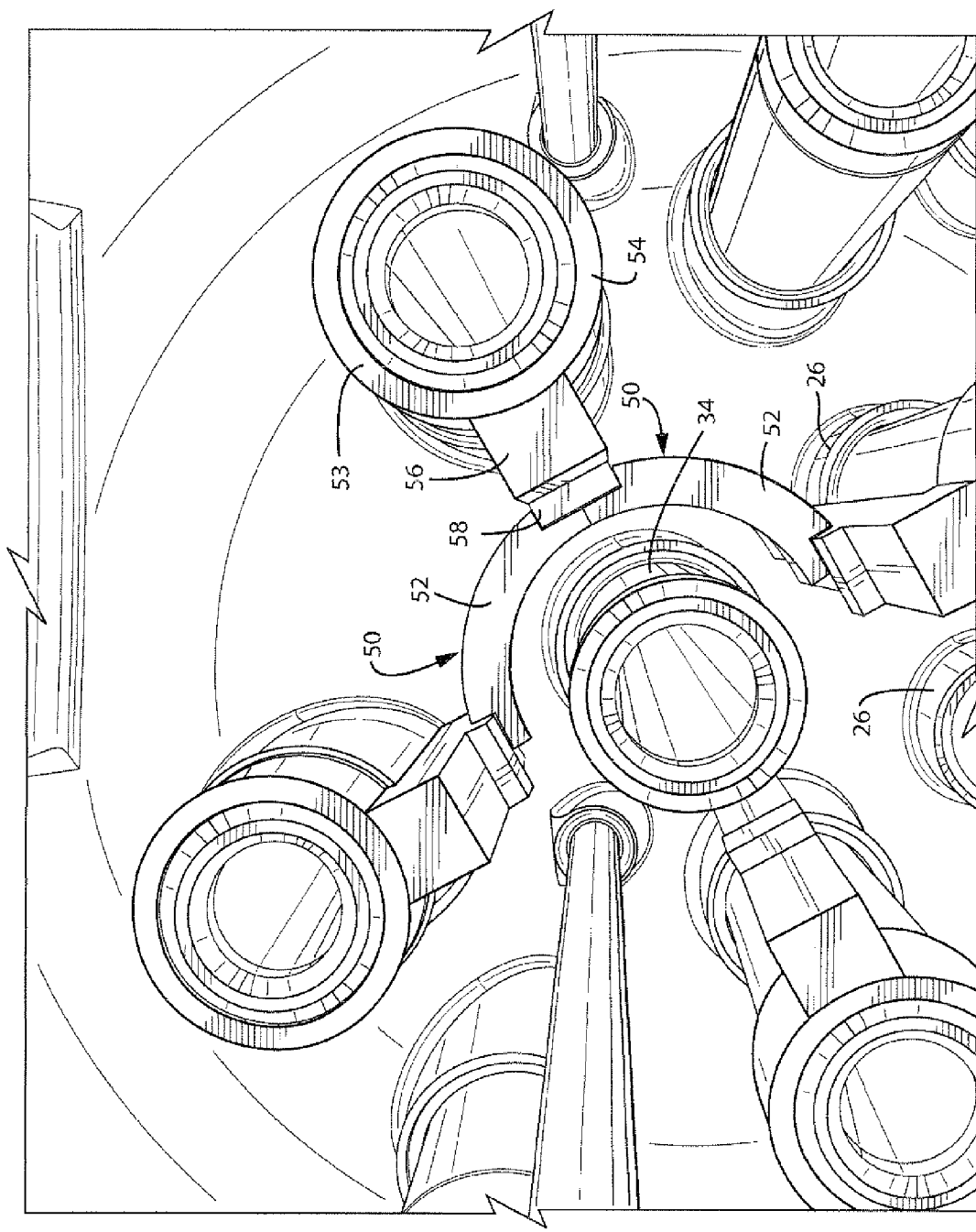
Figure 4:
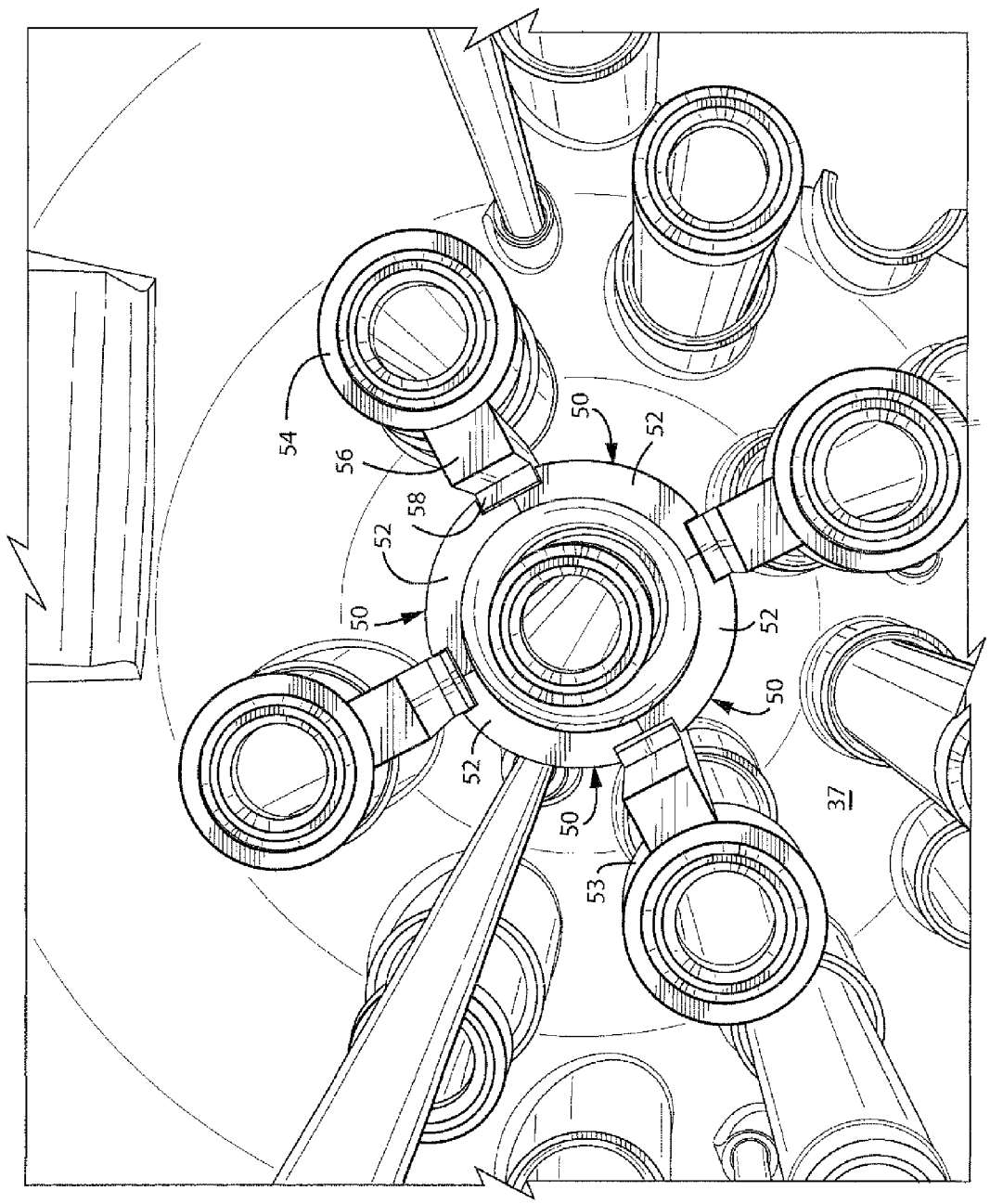

Referring to FIGS. 2-4, there are illustrated control rod drive housings 34 and stub tubes 26 secured to the hemispherical bottom head 24, the steel cladding 37 of which lies along the inside surface thereof. As noted previously, weld repairs are often times necessary adjacent to the bottom head 24, e.g., about the stub tubes 26 and for cladding surface repair on the bottom head. Previously, the reactor vessel was drained of the water to effect the repairs. However, it is more economical if the vessel does not require draining to perform these repairs and instead the repairs can be effected underwater. This necessitates a dry environment.

In accordance with a preferred aspect of the present invention, a dry welding environment is provided by deploying a caisson. However, providing a caisson to effect a dry environment for welding presents certain difficulties. For example, locating the caisson on the hemispherical and uneven cladding surface along the bottom head is difficult because the diametrical size of the core plate holes through which all equipment must pass to obtain access to the interior of the bottom head imposes a size limitation. Secondly, it is difficult to seal the caisson against the very uneven surface of the bottom head due to the presence of the cladding on the hemispherical surface. It is even more difficult to seal the caisson on the steep incline of the bottom head adjacent the outer periphery of the head.

Figure 5:
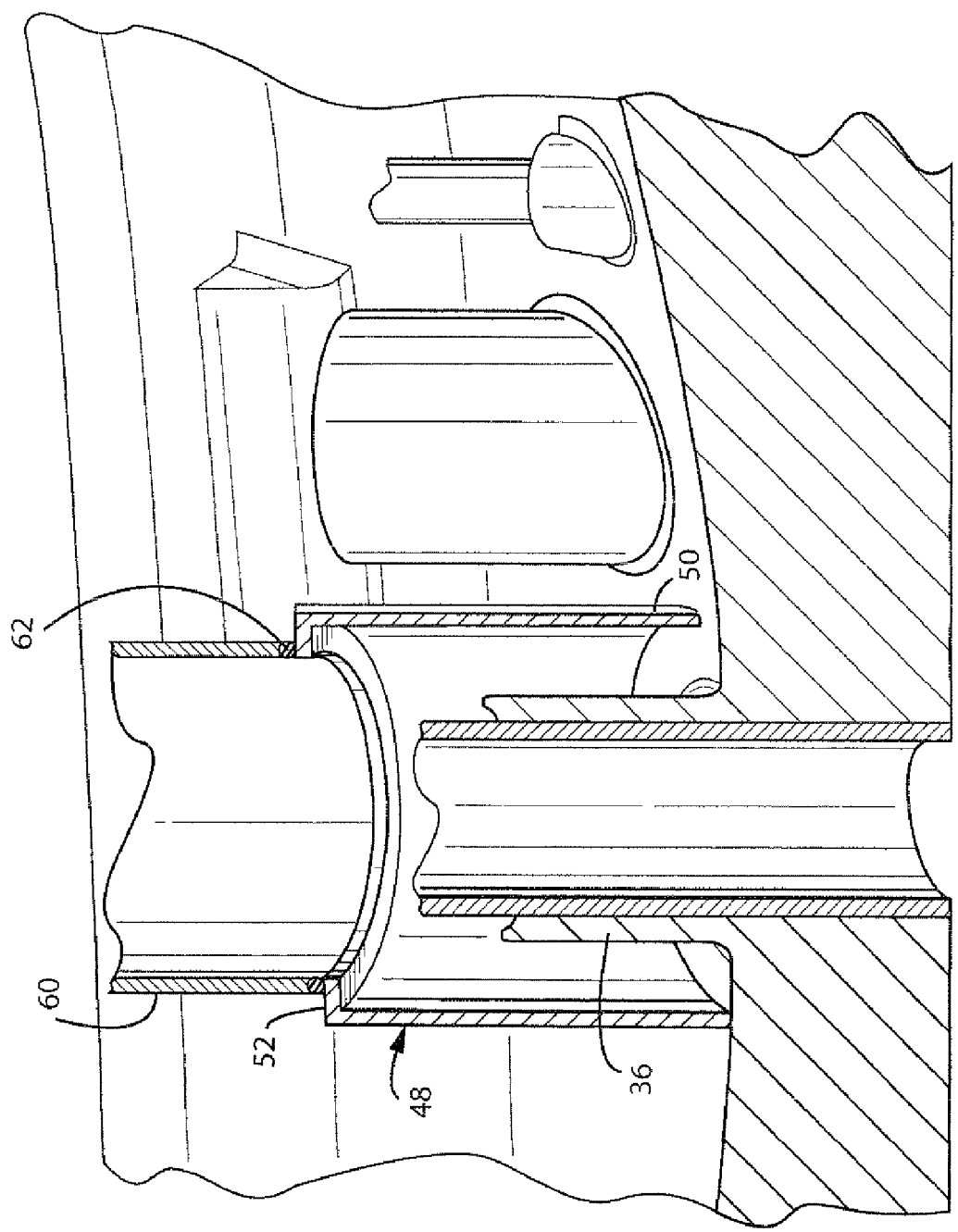
FIG. 5 is a fragmentary enlarged cross-sectional view illustrating a segmented caisson about a stub tube requiring repair.

Generally, the diameter of the core plate holes are smaller than the space needed to pass a caisson through a hole. The holes are also too small for a welding apparatus to maneuver in the work area, i.e., to be passed through the core plate hole to a location adjacent the interior surface of the bottom head. The present invention addresses those two problems by providing a segmented lower caisson 48 in which segments are receivable through the core plate holes for assembly adjacent the interior surface of the bottom head. Each segment for each lower caisson may be unique dependent upon its location along the interior surface of the bottom head. Because of the hemispherical shape of the bottom head at each location in which weld repairs are to be effected, it will be appreciated that the lower edges of each segmented caisson are beveled or tapered to form an edge complementary to the shape of the bottom head at that location. For example, as illustrated in FIGS. 2 and 5, a lower caisson segment 50 includes a wall, preferably in the shape of a quadrant of a cylinder, having a lower edge generally complementary to the shape of the interior surface of the bottom head 24 to which the lower edge of the segment will be sealed to form, in conjunction with other caisson segments a dry caisson environment. The upper edge of the caisson segment 50 has a flat inwardly directed flange 52 which, when all of the caisson segments are sealed and secured about for example a stub tube 26, will form a horizontal support surface for receiving the lower edge of an upper cylindrical caisson. In FIG. 2, one segment is illustrated; in FIG. 3 two segments are illustrated and in FIG. 4 four segments forming a complete annulus about the stub tube 6 are illustrated. It will also be appreciated that the final assembled annulus, as described below, has a diameter larger than the diameter of the core plate openings 15 and hence cannot be passed through those core plate openings 15 in its assembled condition.

To form the lower caisson about the stub tube or to secure a lower caisson to the bottom head to effect weld repairs and without first draining water from the reactor vessel, segment holddowns 53 are first installed. Referring to FIG. 2, each segment holddown 53 includes a ring 54 sized to engage about an adjacent control rod drive housing 34 and a separate holddown lug 56. The ring 54 and lug 56 are sized to pass through the core plate holes 15. With the ring properly positioned about a control rod drive housing 34 using suitable conventional tools, the separate lug 56 can be bolted to one side of the ring 54 adjacent to the stub tube 36 to which repairs will be effected. The lug 56 includes a flange 58 which, when assembled to the ring 54, may overlie and hold down the caisson segment 50. With four segment holddowns 53 in place on housings 34 surrounding the stub tube 26 in need of repair, the four segments 50 are arranged in sequence, i.e., inserted through the core plate openings 15 and located below the flanges 58. Alternatively, each holddown 53 is installed followed by installation of a segment 50, which is located below the flange 58 of the installed holddown 53. Thus, the flanges 58 on the lugs 56 hold the segments between the flanges and the interior surface of the bottom head 24. As illustrated in FIG. 4, the four segments of the lower caisson thus form an annulus about the stub tube 26 and their lower edges are held against the interior surface of the bottom head 24.

Figure 6:
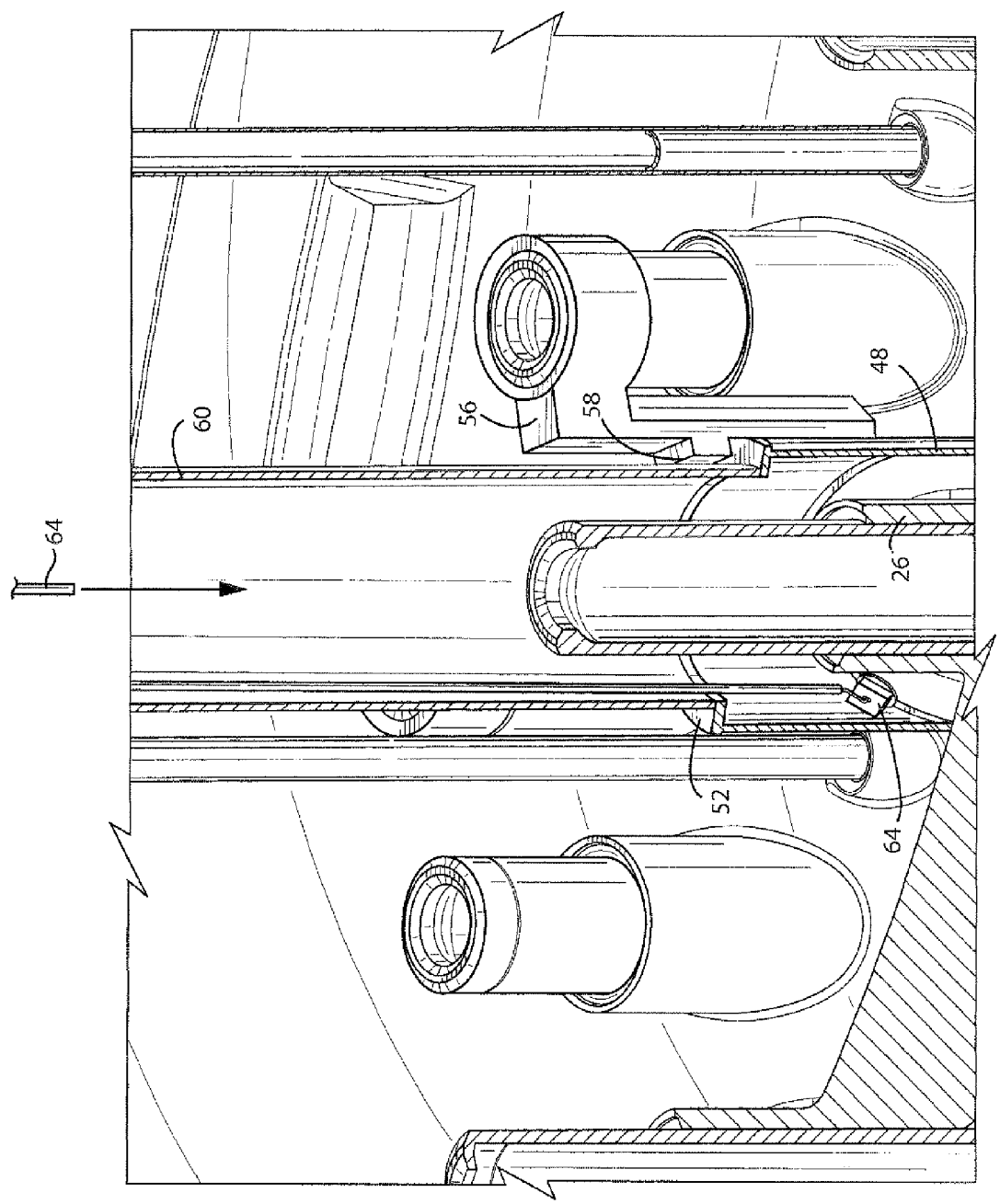
FIG. 6 is a view similar to FIG. 5 illustrating a welding head within the caisson effecting the weld repair.

A water curable polymer is pressure injected into all of the joints between the segments 50 of the lower caisson and also between the lower edges of the caisson segments and the interior surface 37 of the bottom head 24. Because the water curable polymer is able to flow, it fills all the cavities that are potential leak paths. Moreover, the segmented lower caisson is provided at a height and width that allows room for a welding tool or torch to maneuver between the stub tube and the segmented caisson, but which is sufficiently short to minimize assembly efforts. Also, the final assembled lower caisson provides a horizontal flanged flat surface 52 that enables an upper second and taller dry caisson 60 to mate with it. The second caisson has a diameter smaller than the diameter of the core plate holes 15 enabling the second caisson to be lowered through the core plate holes such that its lower annular edge seats on the horizontal annular flange 52 of the lower caisson. A seal 62 is provided between the upper and lower caissons, e.g., an o-ring seal may be provided on the lower end of the upper caisson to seal against the flange. The upper caisson 60 may be provided in discrete lengths with seals, e.g., o-ring seals, between each length such that the upper end of the upper caisson 60 extends into the volume of the upper head 22. With the lower caisson 48 sealed to the bottom head 24 and the upper caisson 60 sealed to the lower caisson 48, the water within the caissons can be pumped such that the caissons 48, 60 are evacuated. Once evacuated, the welding equipment may be disposed through the upper caisson 60 into the lower caisson 48 and a welding head 64 (see FIG. 6) is located to effect the repair along the stub tube 26 or the cladding 37 of the interior surface of the bottom head 24 in a dry environment. Tig welding processes may be utilized. Once the repair or repairs have been effected, the welding equipment can be withdrawn, the caissons removed and the holddowns removed as well.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear reactor vessel having a core plate and a generally hemispherically shaped bottom head with a plurality of penetrations enabling control rod drives to pass through said plurality of penetrations to support a respective plurality of control rods, a method of repairing or mitigating crack formation at said hemispherically shaped bottom head of the vessel comprising the steps of:

passing plural discrete segments of a first caisson through holes in the core plate to a location about a tube secured to said hemispherically shaped bottom head and surrounding a one of said plurality of penetrations;

assembling said plural discrete segments about said tube;

sealing said plural discrete segments to one another and to said generally hemispherically shaped bottom head;

passing a second caisson through one of said holes in the a core plate and causing a lower edge of said second caisson to engage an upper edge of said first caisson;

removing water from said first and second caissons to provide a water-free environment for welding; and lowering a welding head through said second caisson and into the first caisson to apply a weld at a weld site about the tube or along said generally hemispherically shaped bottom head.

2. A method according to claim 1, wherein said first caisson has a diameter greater than a diameter of said one of the holes in said core plate.

3. A method according to claim 1, including forming at least a pair of segments of the first caisson uniquely and different in configuration relative to one another to accommodate said generally hemispherically shaped bottom head.

4. A method according to claim 1, wherein said generally hemispherically shaped bottom head has a vertically extending axis through its lowest point, including forming at least a pair of said plural segments of said first caisson having different heights relative to one another such that upper edges thereof lie in a horizontal plane normal to said vertically extending axis.

5. A method according to claim 4, wherein bottom edges of said plural segments are tapered to accommodate inclines along said generally hemispherically shaped bottom head.

6. A method according to claim 1, including passing a holddown through a hole in the core plate, securing said holddown to said generally hemispherically shaped bottom head adjacent the weld site and engaging said holddown and at least one of said plural segments to maintain said at least one of said segments adjacent an interior surface of said generally hemispherically shaped bottom head prior to sealing said plural segments to one another and to said generally hemispherically shaped bottom head.

7. A method according to claim 6, including forming the holddown in at least two distinct parts, separately passing said at least two distinct parts through one or more of the holes in the core plate, assembling said at least two distinct parts to one another below the core plate and in a water environment of the reactor vessel to form assembled holddown, and engaging the assembled holddown and said at least one segment to maintain said at least one segment adjacent the interior surface of the generally hemispherically shaped bottom head.

8. A method according to claim 7, wherein the generally hemispherically shaped bottom head includes a plurality of control rod drive housings projecting upwardly therefrom at locations about said tube, separately passing a plurality of distinct holddown parts through one or more of the holes in the core plate for assembly into a plurality of holddowns, securing said plurality of holddowns to control rod drive housings about the tube, and engaging said plurality of holddowns and said plurality of segments to one another to maintain said plurality of segments adjacent the generally hemispherically shaped bottom head about the tube.

9. In a nuclear reactor vessel having a core plate and a generally hemispherically shaped bottom head, a method of repairing or mitigating crack formation at the bottom head of the vessel comprising the steps of:
  passing segments of a first caisson through holes in the core plate to a location adjacent the bottom head;
  assembling the segments to form an enclosure;
  sealing the segments to one another and to the bottom head;
  passing a second caisson through a core plate hole and sealing a lower end thereof to an upper end of the first caisson;
  removing water from the first and second caissons to provide a water-free environment for welding; and
  lowering a welding head through the second caisson and into the first caisson to apply a weld.

10. A method according to claim 9, including providing arcuate segments, assembling the arcuate segments to form an assembled first caisson having a diameter for greater than a diameter of the core plate hole.

* * * * *

UNITED STATES PATENT AND TRADEMARK OFFICE
CERTIFICATE OF CORRECTION

PATENT NO. : 7,754,993 B2  Page 1 of 1
APPLICATION NO. : 11/482798
DATED : July 13, 2010
INVENTOR(S) : Frank Ortega It is certified that error appears in the above-identified patent and that said Letters Patent is hereby corrected as shown below:

Column 3, lines 11-12, delete "stub tube 6" and insert --stub tube 26--

Claim 1 at Column 4, lines 27-29, delete "a" after --surrounding--

Claim 7 at Column 5, line 6, insert --an-- before --assembled holddown--

Signed and Sealed this

Seventeenth Day of August, 2010

David J. Kappos
*Director of the United States Patent and Trademark Office*